(12) United States Patent
Kristiansen

(10) Patent No.: US 9,651,183 B2
(45) Date of Patent: May 16, 2017

(54) CONTROLLING HEATING AND COMMUNICATION IN A PIPELINE SYSTEM

(71) Applicant: Karstein Kristiansen, Trondheim (NO)

(72) Inventor: Karstein Kristiansen, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/799,190

(22) Filed: Jul. 14, 2015

(65) Prior Publication Data

US 2016/0018040 A1    Jan. 21, 2016

(30) Foreign Application Priority Data

Jul. 15, 2014   (EP) .................................... 14177116

(51) Int. Cl.
| | | |
|---|---|---|
| *F16L 53/00* | (2006.01) | |
| *E21B 43/12* | (2006.01) | |
| *H05B 1/02* | (2006.01) | |
| *F17D 1/05* | (2006.01) | |
| *F17D 3/00* | (2006.01) | |

(52) U.S. Cl.
CPC ........... *F16L 53/004* (2013.01); *F16L 53/007* (2013.01); *F17D 1/05* (2013.01); *F17D 3/00* (2013.01)

(58) Field of Classification Search
CPC F16L 53/04; F16L 53/007; F17D 1/05; Y10T 137/6416; Y10T 137/6606; E21B 36/00; E21B 36/005; E21B 36/04; E21B 43/24
See application file for complete search history.

(56) References Cited

U.S. PATENT DOCUMENTS

| | | | |
|---|---|---|---|
| 6,049,657 A | 4/2000 | Sumner | |
| 6,267,172 B1 * | 7/2001 | McClung, III | E21B 17/01 126/612 |
| 6,338,381 B1 * | 1/2002 | McClung, III | E21B 17/01 165/45 |
| 6,617,556 B1 | 9/2003 | Wedel | |
| 6,707,012 B2 * | 3/2004 | Stone, Jr. | E21B 36/04 219/482 |
| 7,931,086 B2 * | 4/2011 | Nguyen | E21B 36/04 166/302 |
| 8,161,998 B2 * | 4/2012 | Matos | F17D 1/086 137/334 |

(Continued)

FOREIGN PATENT DOCUMENTS

| | | |
|---|---|---|
| DE | 102008056087 A1 | 5/2010 |
| WO | WO2010052126 A1 | 5/2010 |
| WO | WO2010069110 A1 | 6/2010 |

OTHER PUBLICATIONS

European Search Report for related European Application No. 14177116.2, dated Jan. 9, 2015.

*Primary Examiner* — Craig Schneider
*Assistant Examiner* — Kevin Barss
(74) *Attorney, Agent, or Firm* — Lempia Summerfield Katz LLC

(57) ABSTRACT

A method for controlling a pipeline system is provided. The method includes powering on an electrical heating source for heating the pipeline system. The method further includes powering off the electrical heating source, powering at least a sensor along the pipeline system for measuring a physical property, and communicating the measured data to a remote communication destination.

10 Claims, 2 Drawing Sheets

(56) References Cited

U.S. PATENT DOCUMENTS

| | | | |
|---|---|---|---|
| 8,985,154 B2* | 3/2015 | Quigley | F16L 11/12 138/33 |
| 2003/0020499 A1* | 1/2003 | Bass | E21B 43/01 324/721 |
| 2008/0314451 A1 | 12/2008 | Matos | |
| 2009/0107558 A1* | 4/2009 | Quigley | F16L 11/12 137/15.01 |
| 2013/0153230 A1 | 6/2013 | Scott et al. | |

\* cited by examiner

CONTROLLING HEATING AND COMMUNICATION IN A PIPELINE SYSTEM

CROSS-REFERENCE TO RELATED APPLICATIONS

The present patent document claims the benefit of EP 14177116.2, filed on Jul. 15, 2014, which is hereby incorporated by reference.

TECHNICAL FIELD

The present embodiments relate to a method for controlling a pipeline system, in particular a pipeline system including heating and communication devices. The present embodiments relate to a control device for the implementation of the method above.

BACKGROUND

In the field of offshore oil and/or gas production, pipeline systems may be used. For example, at offshore oilfields, subsea pipelines are used to transport the multiphase mixture of oil, gas and water from producing wells to the processing facilities on the land. Several kilometers of pipeline run on the seabed for this purpose.

Pipelines may be provided with a heating system. The oil and or gas products inside the pipeline may exit from a well at a high temperature and pressure, but are kept warm along the pipeline in order to avoid the formation of plugs. This may become critical particularly during production shutdowns. Considering that a length of a pipeline may be in the order of several kilometers, the electrical current passing through the heating system may be high and the magnetic field generated is proportional to the current.

One known heating system is Direct Electrical Heating (DEH), based on the use of the metallic pipeline as one thermal conductor and a cable (e.g., a "piggyback" cable) connected to the metallic pipeline and used as another thermal conductor.

The pipeline is provided with a coating for isolating the pipeline from the contact with sea water (e.g., in order to prevent corrosion). Additionally, the coating also helps in preventing heating power from the heating system to be lost to the external environment.

Along the pipeline, a plurality of sensors may be installed for remotely monitoring the conditions of the pipeline itself and may promptly detect any damage or problem. The sensors communicate measured values to a pipeline monitor and control center that may either be onshore or offshore. For example, PH sensors may be provided for indirect measurement of corrosion or pressure sensors may be provided for monitoring any excessive pressure drop along the pipeline that may be due to a leak. Mass flow rate sensors may also be installed for detecting leaks. Ultra sound transducers may also be used for corrosion measurements and strain gauge sensors may be used for displacement measurements along the pipeline.

The main drawback of such a layout structure is that transferring data from the sensors to the control center is so disturbed as to be practically muted by the electromagnetic field generated by the heating system.

SUMMARY AND DESCRIPTION

The scope of the present invention is defined solely by the appended claims and is not affected to any degree by the statements within this summary. The present embodiments provide a method and a control device for controlling a pipeline system that may overcome at least part of the above and/or other drawbacks.

One or more of the present embodiments may provide a method and a control device for efficiently controlling both heating and communication of measured data in a pipeline system such that communication of data measured along the pipeline system is not influenced by any strong electromagnetic field generated by any electrical heating system.

In an aspect, a method and a control device for controlling a pipeline system is provided.

According to a first aspect, a method for controlling a pipeline system is provided. The pipeline system includes a pipeline portion, an electrical heating source distributed along the pipeline portion, and at least one sensor on the pipeline portion for measuring a physical property along the pipeline portion. The sensor includes a communication device for communicating the measured data to a remote communication destination. The method includes an act of powering the electrical heating source for heating the pipeline portion, and an act of switching off the electrical heating source, powering the sensor for measuring a physical property, and communicating the measured data to the communication destination.

Switching off the electrical heating source may provide that each sensor communicates without being disturbed by the strong electromagnetic field created by the heating process. Time of operation may be divided into two different time frames for two different tasks, such as heating and sensor operations (e.g., measuring communicating data).

According to an embodiment, the acts are executed immediately one after the other.

According to an embodiment, the acts are periodically executed, each time period including an execution of one of the acts immediately followed by an execution of the other act.

The heating act and the act of measuring and transmitting the physical properties are executed alternatively, thus making it possible to program automatically the switching on and off of both the two acts of the method.

According to an embodiment, the duration of measuring and transmitting act is less than 2% shorter or less than 1% shorter than the duration of the heating act.

Advantageously, thanks to the thermal inertia of the pipeline portion and to the coating that prevents heating power to be lost towards the external environment, the heating system may be switched for short period of times, compared to the time during which the heating system is switched on. Shortness of the second act with respect to the first act is nevertheless sufficient to assure a proper functioning of the sensors, both in terms of properties measurements and data transmission.

According to a second aspect, a control system is associated to a pipeline system for controlling the execution of the acts of the method above described.

The same advantages mentioned with reference to the first aspect may be achieved also by the second aspect.

DETAILED DESCRIPTION OF THE DRAWINGS

Figure 1:
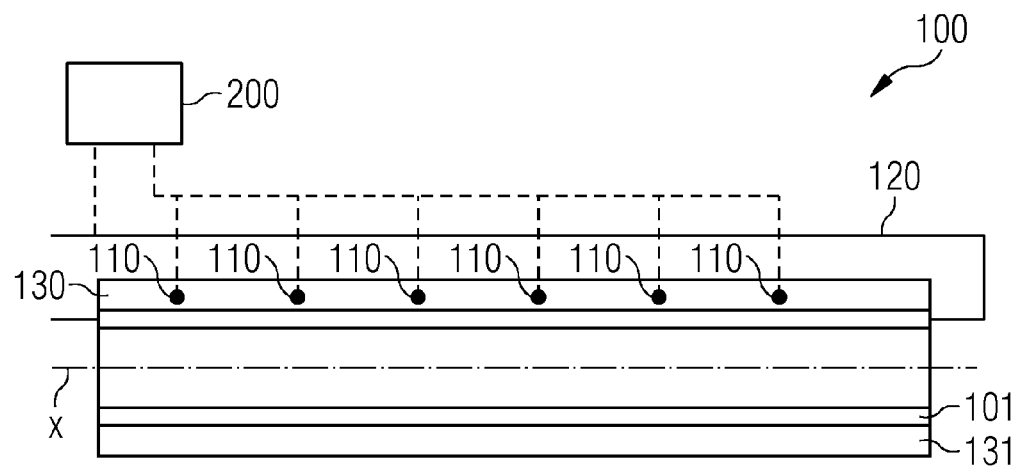
FIG. 1 depicts a schematic view of a pipeline system managed by a method according to an embodiment.

FIG. 1 depicts a pipeline system 100 according to an embodiment.

The pipeline system 100 includes a metallic pipeline portion 101 that may be used in a subsea installation for connecting a well in an offshore oil and/or gas extraction field to an onshore processing facility (e.g., a refinery).

According to different embodiments, the pipeline portion 101 may coincide with an entire subsea pipeline, extending on the seabed from a well to an onshore processing facility, or the pipeline portion 101 may be only a part of the subsea pipeline.

The pipeline system 100 further includes a coating 130 for protecting the pipeline portion 101 from the contact with the sea water that generates corrosion. Processes and materials used in the coating process are conventional and known in the art and are not described in further detail. The coating provides an external smooth cylindrical surface 131 to the pipeline portion 101.

The pipeline system 100 further includes a plurality of sensors 110, in contact with the pipeline portion 101.

Sensors used along a pipeline installation may include: electrical or electrochemical sensors for corrosion detection; PH sensors for indirect corrosion detection; pressure sensors for monitoring pressure drops along the pipeline portion 101 and may detect leaks through excessive pressure drop detection; mass flow rate sensors for monitoring the quantity of oil and/or gas transferred along the pipeline and to detect leaks; temperature sensors for controlling that oil and/or gas inside the pipeline are above a desired level (e.g., to avoid plug formation); or other sensors.

Figure 2:
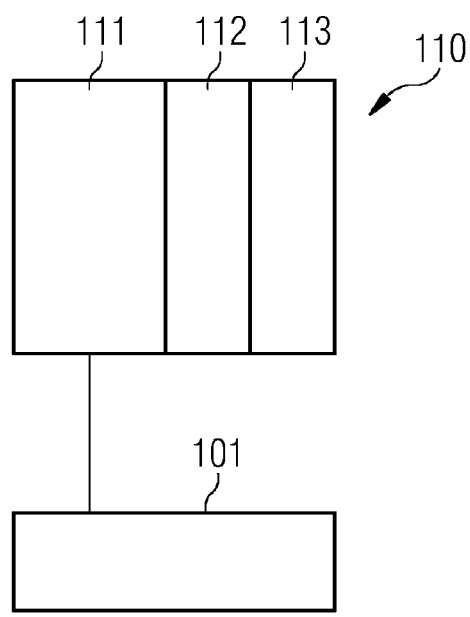
FIG. 2 depicts a schematic block view of a sensor for the pipeline of FIG. 1.

A sensor 110 is schematically depicted in FIG. 2. Each sensor 110 includes a probe 111 for the measurement of a respective physical property (e.g., PH, pressure, or temperature). The probe is directly connected to the pipeline portion 101 for the measurement of the respective physical property. Each sensor 110 also includes an electronic circuit 112 for receiving and transmitting the measured property to a control and monitoring center, which may be either offshore or onshore, and a reserve of charge 113 for powering the sensor 110.

In an embodiment, the electronic circuit 112 may elaborate the measured property (e.g., filter the measured data) before transmission.

The communication between the sensors 110 and the control and monitoring center takes place wirelessly along the pipeline. The measured value propagates from sensor to sensor via radio frequency, until it reaches the end of the pipeline.

According to an embodiment, other types of communication (e.g., different from a communication involving radio frequency) may be envisaged.

According to an embodiment, the reserve of charge 113 may be of any type (e.g., a conventional battery to be changed with a new battery of the same type when run off of charge or a rechargeable battery to periodically recharged).

The pipeline system 100 includes also a Direct Electric Heating (DEH) that includes a metallic cable 120 (e.g., a "piggyback" cable) connected to the metallic wall of the pipeline portion 101. The current flowing in the cable 120 and in the pipeline wall transfers heat to pipeline and through the pipeline to the oil and/or gas products inside the pipeline (e.g., that may be kept above a desired temperature), avoiding plug formation.

The metallic cable 120 is also a magnetic field source creating an electromagnetic field in which the sensors 110 are immersed. Therefore, when the metallic cable 120 is switched on for heating the pipeline preventing the formation of plugs along the pipeline, the metallic cable 120 also disturbs the optimal working of any sensor 110 installed along the pipeline portion 101.

Figure 3:
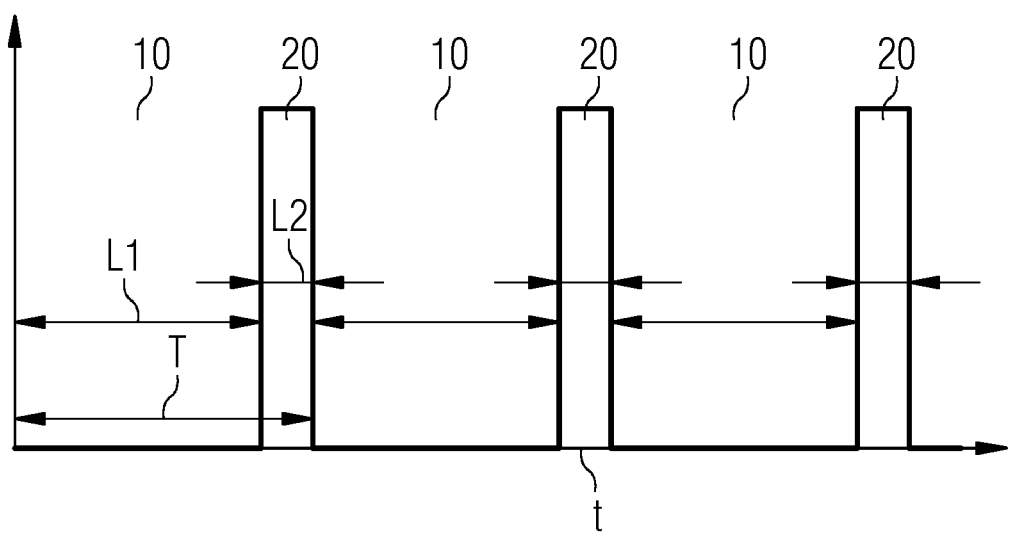
FIG. 3 depicts a diagram illustrating two acts of the method according to an embodiment.

With reference to FIG. 3, a method for controlling the pipeline system 100 includes act 10 during which the electrical cable 120 is powered for heating the pipeline portion 101, and act 20 during which the electrical heating source 120 is switched off and the sensor 110 is powered for measuring a physical property and communicating the measured data.

The metallic cable 120 providing the magnetic field source for the charging of each accumulator 113 may be periodically switched off without prejudicing its function of heating the pipeline portion 101 and preventing plug formation (e.g., due to the thermal inertia of the metallic wall of the pipeline portion 101 and to the coating 130 that prevents heating power to be lost towards the external environment).

Act 10 has a duration L1 (e.g., in the range of hours). Act 20 has a duration L2 (e.g., in the range of minutes). In an example, the duration of act 20 is less than 2% shorter than the duration of act 10, or the duration of act 20 may be less than 1% shorter than the duration of act 10.

Acts 10 and 20 are periodically executed with a period having a duration T (e.g., the sum of L1 and L2).

In an embodiment, acts 10 and 20 may be programmed in and executed automatically in the time domain t (e.g., as represented in FIG. 3).

The time intervals during which the metallic cable 120 is switched off are used by the plurality of sensors 110 to transmit the respective measured physical properties to the control and monitoring center. The data transmission may not be disturbed by the magnetic field of the metallic cable 120.

The pipeline system 100 includes a control device 200 for the implementation of the acts of the method of one or more of the present embodiments (e.g., for controlling the alternative execution of acts 10 and 20). The control device 200 is connected to the metallic cable 120 for controlling the switching on and switching off of the metallic cable 120. The control device 200 may be connected wirelessly to the sensors 110 for receiving the measured data that propagates along the pipeline (e.g., via radio frequency).

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for controlling a pipeline system comprising a pipeline portion, an electrical heating source distributed along the pipeline portion, and at least one sensor on the pipeline portion for measuring a physical property along the pipeline portion, the sensor comprising a communication device for communicating the measured data to a remote communication destination, the method comprising:
   a first act of powering on the electrical heating source for heating the pipeline portion; and
   a second act of switching off the electrical heating source, powering on the sensor for measuring a physical property, and communicating the measured data to the communication destination.

2. The method of claim 1, wherein one of the first act or the second act is executed immediately after the other of the first act or the second act.

3. The method of claim 2, wherein the electrical heating source and the sensor are periodically powered on, each time period including powering on one of the electrical heating source or the sensor immediately followed by powering on of the other the electrical heating source or the sensor.

4. The method of claim 3, wherein duration of second act is less than 2% shorter than duration of the first act.

5. The method of claim 2, wherein the first act and the second act are periodically executed, each time period including an execution of one of the first act or the second act immediately followed by an execution of the other of the first act or the second act.

6. The method of claim 5, wherein duration of second act is less than 2% shorter than duration of the first act.

7. The method of claim 1, wherein duration of second act is less than 2% shorter than duration of the first act.

8. The method of claim 1, wherein duration of second act is less than 1% shorter than duration of the first act.

9. A control system associated to a pipeline system comprising a pipeline portion, an electrical heating source distributed along the pipeline portion, and at least one sensor on the pipeline portion for measuring a physical property along the pipeline portion, the sensor comprising a communication device for communicating the measured data to a remote communication destination, the control system configured to:
   power on the electrical heating source for heating the pipeline portion; and
   switch off the electrical heating source, power on the sensor for measuring a physical property, and communicate the measured data to the communication destination.

10. The control system of claim 9, wherein the electrical heating source or the sensor is powered on immediately after the other of the electrical heating source or the sensor is powered on.

* * * * *